(12) United States Patent
Homma et al.

(10) Patent No.: US 8,731,283 B2
(45) Date of Patent: May 20, 2014

(54) INFORMATION PROCESSING APPARATUS, INFORMATION PROCESSING METHOD AND INFORMATION PROCESSING PROGRAM

(75) Inventors: Fuminori Homma, Tokyo (JP); Kouichi Matsuda, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1240 days.

(21) Appl. No.: 12/606,544

(22) Filed: Oct. 27, 2009

(65) Prior Publication Data
US 2010/0104177 A1 Apr. 29, 2010

(30) Foreign Application Priority Data

Oct. 28, 2008 (JP) ............................... P2008-276884

(51) Int. Cl.
*G06K 9/00* (2006.01)
(52) U.S. Cl.
USPC .......................................... 382/164; 382/141
(58) Field of Classification Search
None
See application file for complete search history.

(56) References Cited

U.S. PATENT DOCUMENTS

| | | | | |
|---|---|---|---|---|
| 5,533,181 A | * | 7/1996 | Bergsneider | 345/473 |
| 7,421,727 B2 | * | 9/2008 | Oya et al. | 725/105 |
| 7,999,849 B2 | * | 8/2011 | Neff et al. | 348/155 |
| 2008/0240517 A1 | * | 10/2008 | Okamoto | 382/118 |
| 2009/0307571 A1 | * | 12/2009 | Gowda et al. | 715/202 |

FOREIGN PATENT DOCUMENTS

JP 2007-180651 7/2007

OTHER PUBLICATIONS

Koshi (JP 2002083304).*
Anonymous, Lifehacker—How Do You Use Dashboard Web Clips?, Jan. 31, 2008, p. 1, www.archive.org/web/20080201234834/http://lifehacker.com/350964/how-do-yo-use-dashboard-web-clips.
European Search Report from EP Application No. 09252157.4-2201 dated Dec. 8, 2009.

* cited by examiner

*Primary Examiner* — Wesley Tucker
*Assistant Examiner* — Ha Le
(74) *Attorney, Agent, or Firm* — Sony Corporation

(57) ABSTRACT

An input control unit that receives first content data from a content delivery apparatus via a communication unit, converts the first content data into first image data before causing a storage unit to store the first image data, receives second content data generated by a portion or all of the first content data being updated from the content delivery apparatus via the communication unit, and converts the second content data into second image data before causing the storage unit to store the second image data, a center of gravity candidate region extraction unit that calculates difference values of color information between corresponding pixels of the first image data and the second image data stored in the storage unit and extracts a center of gravity candidate region, which is a region constituted by pixels the difference values of which exceed a threshold value stored in the storage unit.

18 Claims, 10 Drawing Sheets

| | | 171 |
|---|---|---|
| 171a | 171b | 171c |

| BLOG TITLE | BLOG LINK | CUTOUT FORM INFORMATION |
|---|---|---|
| NEWS ARTICLE N1 | LINKED TO 1 | FACE REGION |
| TODAY'S SCENE | LINKED TO 2 | IMAGE REGION |
| J-KO'S ROOM | LINKED TO 3 | IMAGE REGION |
| WEATHER FORECAST | LINKED TO 4 | IMAGE REGION |
| EARTHQUAKE INFORMATION | LINKED TO 5 | HEADING REGION |
| OO SWIMMING BEACH | LINKED TO 6 | DEFAULT |
| SPORTS NEWS | LINKED TO 7 | IMAGE REGION |
| BLOG BY MR. AND MRS. K | LINKED TO 8 | IMAGE REGION |
| INFORMATION ABOUT MISSING CHILDREN | LINKED TO 9 | FACE REGION |

FIG.6

| TIME STAMP | UNREAD FLAG | ARTICLE TITLE | ARTICLE LINK | THUMBNAIL IMAGE | NUMBER OF IMAGES | IMAGE FILE 1 | IMAGE FILE 2 | IMAGE FILE 3 |
|---|---|---|---|---|---|---|---|---|
| 3056281 | 1 | OCT. 8, 2008 | LINKED TO 21 | STORED IN 71 | 1 | STORED IN 11 | | |
| 3056343 | 1 | OCT. 9, 2008 | LINKED TO 22 | STORED IN 72 | 1 | STORED IN 12 | | |
| 3056375 | 1 | MORNING NEWS | LINKED TO 23 | STORED IN 73 | 1 | STORED IN 13 | | |
| 3056390 | 1 | EVENING NEWS | LINKED TO 24 | STORED IN 74 | 1 | STORED IN 14 | | |
| 3056453 | 1 | WE WENT TO THE SEASIDE | LINKED TO 25 | STORED IN 75 | 3 | STORED IN 15 | STORED IN 35 | STORED IN 55 |
| 3056765 | 1 | WEEKLY WEATHER | LINKED TO 26 | STORED IN 76 | 3 | STORED IN 16 | STORED IN 36 | STORED IN 56 |
| 3057171 | 1 | KINKI REGION | LINKED TO 27 | STORED IN 77 | 3 | STORED IN 17 | STORED IN 37 | STORED IN 57 |
| 3057500 | 1 | OCT. 9, 2008 | LINKED TO 28 | STORED IN 78 | 1 | STORED IN 18 | | |
| 3057515 | 1 | COUNTRY A VERSUS COUNTRY B | LINKED TO 29 | STORED IN 79 | 3 | STORED IN 19 | STORED IN 39 | STORED IN 59 |
| 3057734 | 1 | CHILD BIRTH | LINKED TO 30 | STORED IN 80 | 1 | STORED IN 20 | | |
| 3057859 | 1 | MISS P-KO | LINKED TO 31 | STORED IN 81 | 3 | STORED IN 21 | STORED IN 41 | STORED IN 61 |

INFORMATION PROCESSING APPARATUS, INFORMATION PROCESSING METHOD AND INFORMATION PROCESSING PROGRAM

BACKGROUND OF THE INVENTION

1. Field of the Invention

The present invention relates to an information processing apparatus, an information processing method, and an information processing program.

2. Description of the Related Art

In a Web technology field of the Internet centered on an information processing apparatus, each version of RSS (RDF (Resource Description Framework) Site Summary) to syndicate latest news or the like and XML (Extensible Markup Language) applied technology such as Atom are beginning to be used more frequently. For example, RSS 1.0 by an RSS-DEV working group is known. Syndication is to deliver update information/summary information or to make a notification thereof.

Moreover, with ever higher performance of mobile devices in recent years, news sites and WEB content such as blogs on the Internet can now be accessed seamlessly from mobile devices. Among others, applications that arrange a plurality of pieces of WEB content as thumbnail images to enable various kinds of processing such as listing, selection/display, copying, deletion, and size change of WEB content are used increasingly widely.

However, the display area of a mobile device is limited and if an attempt is made to display a plurality of such thumbnail images, the display area of each image becomes smaller. Thus, an issue of deterioration of visibility arises with an increasing number of pieces of WEB content to be listed. Therefore, in order to enable a listing without deterioration of visibility, an approach such as detecting an important portion of WEB content and using clipped information around the portion becomes necessary. Here, a challenge is "how to detect an important portion of WEB content".

As a general solution, a technique to efficiently list only differential information of WEB content using image data and text summaries contained in feed information transmitted by syndication technology such RSS can be considered.

However, according to this technique, there is a limitation that to what extent information of WEB content should be incorporated into feed information can freely be decided by the Internet service provider that delivers feed information. Thus, for example, there is an issue that feed information containing advertising image data irrelevant to WEB content may be delivered. Also, there is an issue that feed information containing neither image data nor text summary may be delivered for reasons of copyrights or communication speed.

As another solution, a technique to access URL (Uniform Resource Locator) information of WEB content necessary for feed information to capture the WEB content and to detect an important region based on face information of photos from the captured content before proposing appropriate layout is known (see, for example, Japanese Patent Application Laid-Open No. 2007-180651).

However, in WEB content such as blogs, a title image portion or advertising images frequently use face images and conversely updated information may contain no face information at all, which makes precision insufficient with which to detect an important region of a blog.

SUMMARY OF THE INVENTION

The present invention has been made in view of the above issues and it is desirable to provide a novel and improved technology capable of cutting out small-area thumbnail image data containing an important region of content.

According to an embodiment of the present invention, there is provided an information processing apparatus including a storage unit that stores a threshold value, a communication unit capable of performing communication with a content delivery apparatus, an input control unit that receives first content data from the content delivery apparatus via the communication unit, converts the first content data into first image data before causing the storage unit to store the first image data, receives second content data generated by a portion or all of the first content data being updated from the content delivery apparatus via the communication unit, and converts the second content data into second image data before causing the storage unit to store the second image data, a center of gravity candidate region extraction unit that calculates difference values of color information between corresponding pixels of the first image data and the second image data stored in the storage unit and extracts a center of gravity candidate region, which is a region constituted by pixels the difference values of which exceed the threshold value stored in the storage unit, and a cutout control unit that cuts out thumbnail image data corresponding to a cutout region, which is a region containing a portion or the whole of the center of gravity candidate region extracted by the center of gravity candidate region extraction unit, from the second image data.

The cutout control unit may calculate, as center of gravity coordinates, average values of coordinates of pixels constituting the center of gravity region extracted by the center of gravity candidate region extraction unit to set, as the cutout region, a predetermined rectangular region specified using the center of gravity coordinates as a reference.

The information processing apparatus may further include a moving image advertising region extraction unit. The input control unit may perform processing to receive the second content data from the content delivery apparatus via the communication unit and processing to convert the second content data into the second image data before causing the storage unit to store the second image data more than once. The moving image advertising region extraction unit may calculate difference values of the color information between corresponding pixels of pieces of the second content data caused to be stored in the storage unit by the input control unit, extract a moving image advertising region, which is a region constituted by pixels the difference values of which exceed the threshold value stored in the storage unit, and extract a center of gravity region by excluding the moving image advertising region from the center of gravity candidate region. The cutout control unit may set a region containing a portion or the whole of the center of gravity region extracted by the moving image advertising region extraction unit as the cutout region.

The cutout control unit may calculate, as center of gravity coordinates, average values of coordinates of pixels constituting the center of gravity region extracted by the moving image advertising region extraction unit to set, as the cutout region, a predetermined rectangular region specified by using the center of gravity coordinates as a reference.

The cutout control unit may set a rectangular region contained in the center of gravity region extracted by the moving image advertising region extraction unit as the cutout region.

The cutout control unit may set a heading region of the center of gravity region extracted by the moving image advertising region extraction unit as the cutout region.

The cutout control unit may set a face region contained in the center of gravity region extracted by the moving image advertising region extraction unit as the cutout region.

The information processing apparatus may further include an input unit. After accepting input of cutout form information indicating a cutout from a user via the input unit, the input control unit may cause the storage unit to store the cutout form information and the cutout control unit may set a region specified by the cutout form indicated by the cutout form information stored in the storage unit as the cutout region.

The information processing apparatus may further include an output control unit and a display unit. The output control unit may display the thumbnail image data cut out by the cutout control unit from the second image data via the display unit.

The information processing apparatus may further include an output control unit that transmits the thumbnail image data cut out by the cutout control unit from the second image data via the transmission unit.

According to the present invention described above, a technology capable of cutting out small-area thumbnail image data containing an important region of content can be provided.

DETAILED DESCRIPTION OF THE EMBODIMENTS

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

1. Overview of the present embodiment
2. Configuration of an information processing system
3. Hardware configuration of an information processing apparatus
4. Operation overview of the information processing apparatus
5. Function configuration of the information processing apparatus
6. Operation of the information processing apparatus
7. Effects according to the present embodiment 1. Overview of the Present Embodiment In an embodiment of the present invention, a situation in which the basic layout and background design of WEB content are generally not changed significantly before and after syndication type WEB content like a blog is updated is noticed. More specifically, the WEB content is handled as an image and an important region of the WEB content is estimated from a difference of images before and after an update to utilize the important region for layout of the thumbnail image display. Moreover, an unnecessary advertising region is estimated, which is utilized for layout of the thumbnail display. The mechanism thereof will be described below.

2. Configuration of an Information Processing System

Figure 1:
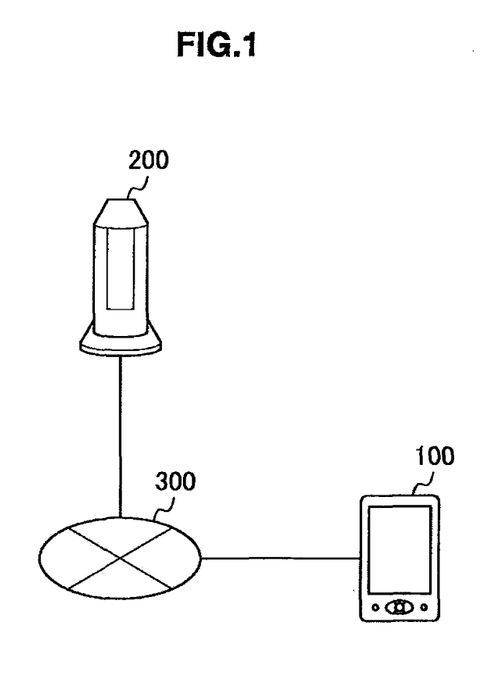
FIG. 1 is a diagram showing the configuration of an information processing system according to an embodiment of the present invention.

First, an information processing system according to an embodiment of the present invention will be described. FIG. 1 is a diagram showing the configuration of an information processing system according to an embodiment of the present invention. The information processing system according to the embodiment of the present invention will be described below using FIG. 1.

As shown in FIG. 1, an information processing system 10 according to an embodiment of the present invention includes an information processing apparatus 100 and a content delivery apparatus 200. In the information processing system 10 shown in FIG. 1, data is exchanged between the information processing apparatus 100 and the content delivery apparatus 200 via a network 300. The type of the network 300 is not specifically limited and includes, for example, the Internet. When the information processing apparatus 100 transmits an acquisition request of feed information to the content delivery apparatus 200, the content delivery apparatus 200 delivers feed information to the information processing apparatus 100. When the information processing apparatus 100 transmits an acquisition request containing information to specify an image file described in feed information, the content delivery apparatus 200 delivers the specified image file to the information processing apparatus 100. When the information processing apparatus 100 transmits an acquisition request containing a URL to specify a WEB page storage disk described in feed information, the content delivery apparatus 200 delivers a WEB page of the specified URL to the information processing apparatus 100.

The information processing apparatus 100 is, for example, a mobile device such as a mobile phone. In the present embodiment, a case in which a mobile device is used as an example of the information processing apparatus 100 will be described, but the information processing apparatus 100 is not limited to any device that can be carried by a user and may be a stationary device. In FIG. 1, only one unit of the information processing apparatus 100 is connected to the network 300, but the number of units thereof is not specifically limited.

An internal configuration of the information processing apparatus 100 will be described later.

The content delivery apparatus 200 delivers content data to the information processing apparatus 100 in accordance with a request from, for example, the information processing apparatus 100. The type of content data delivered by the content delivery apparatus 200 is not limited as long as the data is a source to be displayed in a display unit. Here, a case in which the content delivery apparatus 200 functions as a WEB server that delivers WEB content data such as blogs as content data will be described.

The network 300 is a communication network that connects the information processing apparatus 100 and the content delivery apparatus 200 communicably in both directions or one direction. The network 300 includes, for example, a public network such as the Internet, a telephone network, a satellite communication network, and a multicasting communication channel or a dedicated network such as a WAN (Wide Area Network), LAN (Local Area Network), IP-VPN (Internet Protocol-Virtual Private Network), Ethernet (registered trademark), and wireless LAN and it does not matter whether the network is by wire or by radio.

In the foregoing, the information processing system 10 according to an embodiment of the present invention has been described. Next, the configuration of the information processing apparatus 100 according to an embodiment of the present invention will be described.

3. Hardware Configuration of an Information Processing Apparatus

Figure 2:
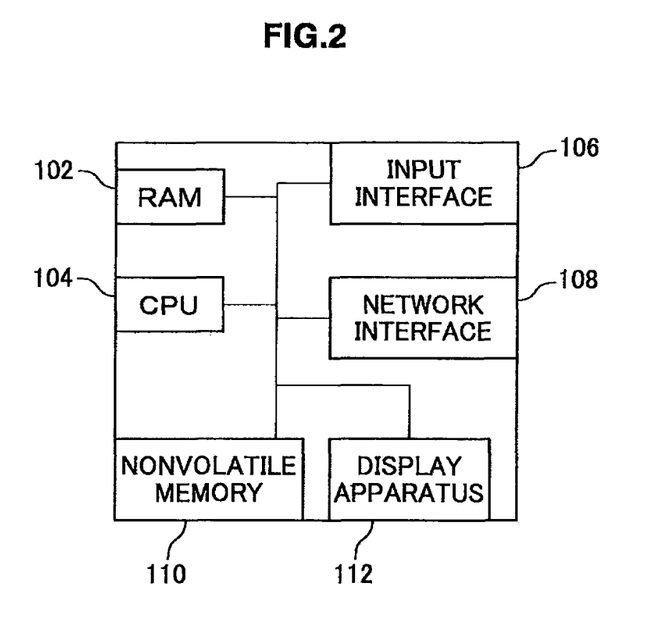
FIG. 2 is a diagram showing the hardware configuration of an information processing apparatus according to an embodiment of the present invention.

FIG. 2 is a diagram showing the hardware configuration of an information processing apparatus according to an embodiment of the present invention. The hardware configuration of the information processing apparatus according to an embodiment of the present invention will be described using FIG. 2.

As shown in FIG. 2, the information processing apparatus 100 according to an embodiment of the present invention includes a RAM (Random Access Memory) 102, a CPU (Central Processing Unit) 104, an input interface 106, a network interface 108, a nonvolatile memory 110, and a display apparatus 112.

The RAM 102 is used to temporarily store programs used by the CPU 104, parameters that change when appropriate during execution thereof, and the like.

The CPU 104 functions as an arithmetic processing unit and a control apparatus and is used to control overall operations of the information processing apparatus 100 or a portion thereof according to various programs recorded in the nonvolatile memory 110 or the RAM 102.

The input interface 106 is, for example, a mouse, keyboard, touch panel, button, switch, or lever operated by the user. The input interface 106 may also be, for example, a remote control (a so-called remocon) using infrared rays or other radio waves, or an externally connected device such as a mobile phone and PDA supporting operations of the information processing apparatus 100. Further, the input interface 106 is configured by an input control circuit that generates an input signal based on information input by the user using, for example, the device used by the user and outputs the input signal to the CPU 104 and the like. The user of the information processing apparatus 100 can input various kinds of data into the information processing apparatus 100 or instruct the information processing apparatus 100 to perform processing operations by operating the input interface 106.

The network interface 108 is, for example, a communication interface configured by a communication device and the like to connect to the network 300. The network interface 108 is, for example, a communication card for wire or wireless LAN (Local Area Network), Bluetooth, or WUSB (Wireless USB), router for optical communication, router for ADSL (Asymmetric Digital Subscriber Line), or modem for various kinds of communication. The network interface 108 can transmit/receive an image signal or the like to/from, for example, the Internet or other communication devices. The network 300 connected to the network interface 108 is configured by a network or the like connected by wire or by radio and may be, for example, the Internet, a home LAN, infrared-ray communication, radiofrequency wave communication, or satellite communication.

The nonvolatile memory 110 is a device for data storage configured as an example of the storage unit of the information processing apparatus 100 and is configured by a magnetic storage device such as an HDD (Hard Disk Drive), semiconductor storage device, optical storage device, or magneto-optical storage device. The nonvolatile memory 110 stores programs executed by the CPU 104, various kinds of data, acoustic signal data, image signal data and the like acquired from outside.

The display apparatus 112 is configured by an apparatus capable of visually notifying the user of acquired information such as a CRT display apparatus, liquid crystal display apparatus, plasma display apparatus, EL display apparatus, and lamp. The display apparatus 112 outputs, for example, results obtained by various kinds of processing performed by the information processing apparatus 100. More specifically, the display apparatus 112 displays results obtained by various kinds of processing performed by the information processing apparatus 100 as text or images.

In the foregoing, an example of the hardware configuration that can realize functions of the information processing apparatus 100 according to each embodiment of the present invention has been shown. Each component may be configured by using general-purpose members or hardware specialized for the function of each component. Therefore, the hardware configuration to be used can be changed when appropriate in accordance with the technical level when the present embodiment is carried out.

In the foregoing, the hardware configuration of the information processing apparatus 100 according to an embodiment of the present invention has been described. Next, an operation overview of the information processing apparatus 100 according to an embodiment of the present invention will be provided.

4. Operation Overview of the Information Processing Apparatus

Figure 3:
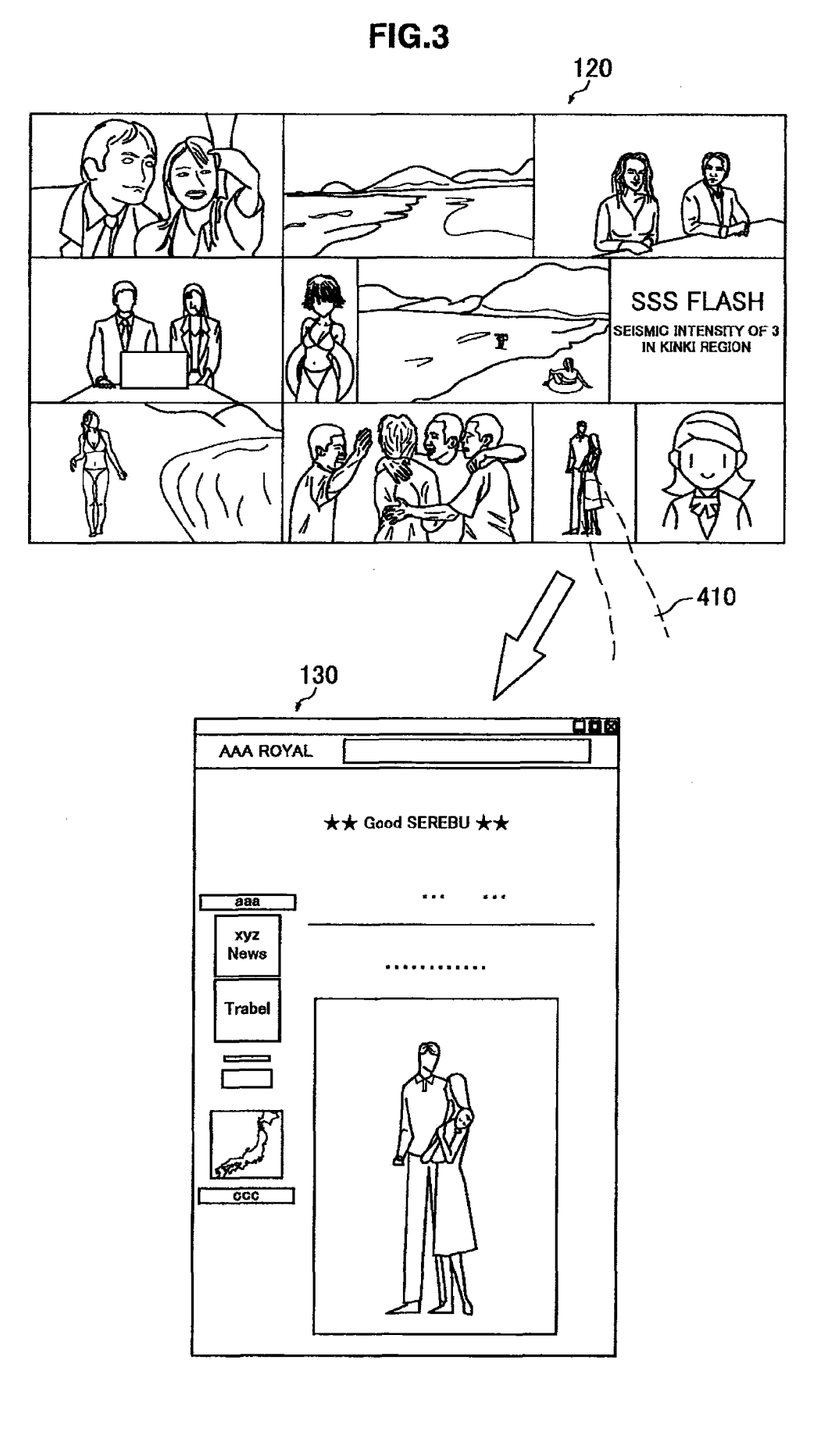
FIG. 3 is a diagram showing an operation overview of the information processing apparatus according to an embodiment of the present invention.

FIG. 3 is a diagram showing an operation overview of the information processing apparatus according to an embodiment of the present invention. An operation overview of the information processing apparatus according to an embodiment of the present invention will be provided below using FIG. 3 (FIGS. 1 and 2 are referred when appropriate).

As shown in FIG. 3, each thumbnail image constituting a thumbnail image display screen 120 corresponds to an important region cut out from each page of 11 WEB pages by the information processing apparatus 100. Technology to cut out each thumbnail image will be described in detail later. The thumbnail image display screen 120 may be displayed in the display apparatus 112 provided with the information processing apparatus 100 or in a display unit provided with an apparatus other than the information processing apparatus 100. The thumbnail image display screen 120 is displayed in a display unit when the user performs a start operation of an application.

In the example shown in FIG. 3, 11 thumbnail images are arranged and displayed in the thumbnail image display screen 120, but the number of displayed thumbnail images is not specifically limited. Also in the example shown in FIG. 3, the shape of each thumbnail image is rectangular, but the shape of the thumbnail image is not specifically limited and may be elliptic, circular or the like. Also in the example shown in FIG. 3, the size of each thumbnail image is not uniform, but the size of each thumbnail image may be uniform.

If the user selects one of thumbnail images constituting the thumbnail image display screen 120, a WEB browser is activated and a transition from the thumbnail image display screen 120 to a WEB page 130 takes place. FIG. 3 shows that the input interface 106 of the information processing apparatus 100 is configured by a touch panel and a thumbnail image second from the right side at the bottom of the thumbnail image display screen 120 is selected by being touched by a contact unit 410, which is a forefinger or the like of the user.

In the foregoing, an operation overview of the information processing apparatus 100 according to an embodiment of the present invention has been provided. Next, the function configuration of the information processing apparatus 100 according to an embodiment of the present invention will be described.

5. Function Configuration of the Information Processing Apparatus

Figure 4:
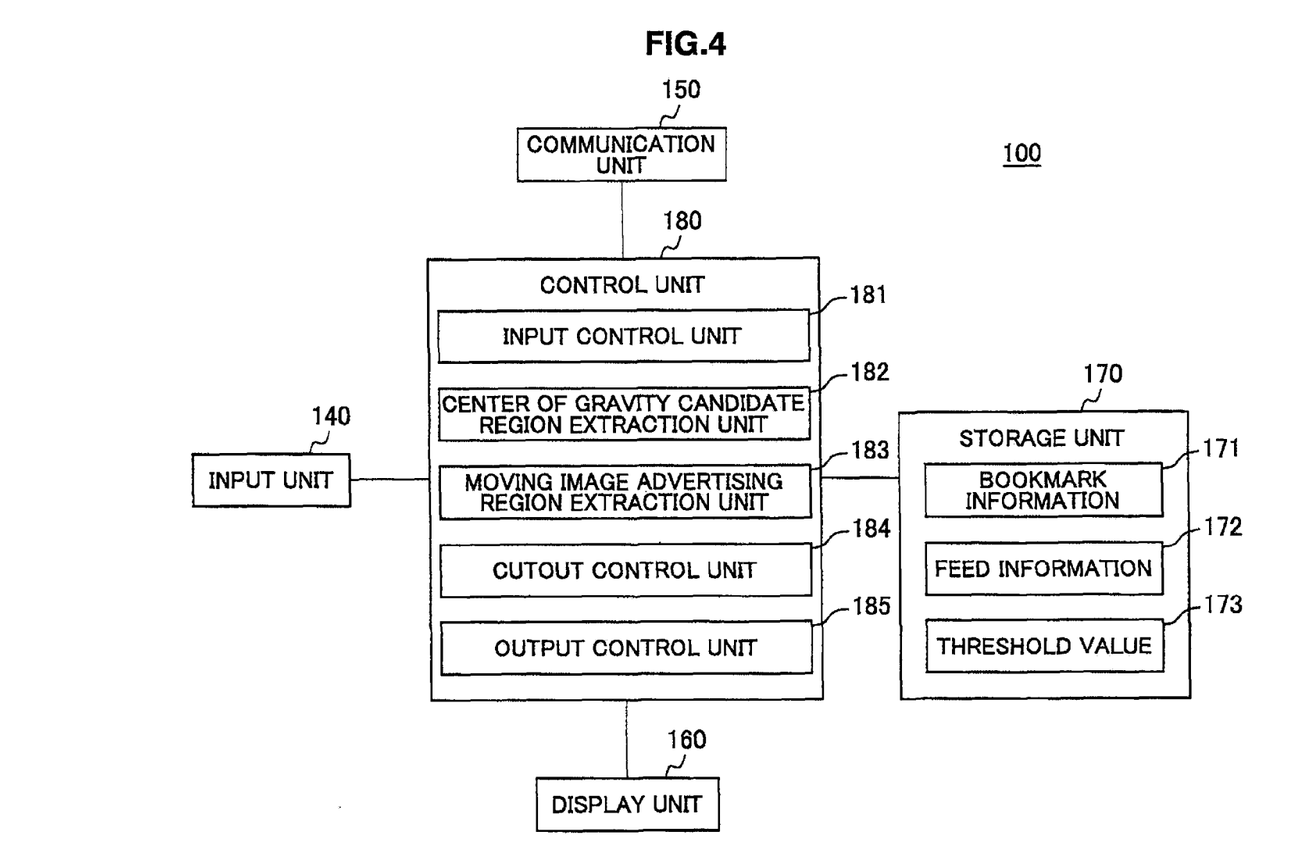
FIG. 4 is a diagram showing the function configuration of the information processing apparatus according to an embodiment of the present invention.

FIG. 4 is a diagram showing the function configuration of the information processing apparatus according to an embodiment of the present invention. The function configuration of the information processing apparatus according to an embodiment of the present invention will be described below using FIG. 4 (FIGS. 1 to 3 are referred when appropriate).

As shown in FIG. 4, the information processing apparatus 100 includes a communication unit 150, a display unit 160, a storage unit 170, and a control unit 180. However, if the apparatus that displays the thumbnail image display screen 120 is other than the information processing apparatus 100, the information processing apparatus 100 may not be provided with the display unit 160.

An input unit 140 is constituted by the input interface 106 or the like and is used to accept input of information from the user to output the information to the control unit 180.

The communication unit 150 is constituted by the network interface 108 or the like and is enabled to perform communication with the content delivery apparatus 200. The communication unit 150 outputs information received from the content delivery apparatus 200 to the control unit 180 and transmits information input from the control unit 180 to the content delivery apparatus 200.

The display unit 160 is constituted by the display apparatus 112 or the like and is used to display information input from the control unit 180.

The storage unit 170 is used to store bookmark information 171, feed information 172, a threshold value 173 and the like. Here, the storage unit 170 is assumed to store the feed information 172, but the storage unit 170 may not store the feed information 172 if the feed information 172 is not used. The threshold value 173 may be stored in the storage unit 170 when the information processing apparatus 100 is manufactured or after the information processing apparatus 100 is manufactured, the user may store the threshold value 173 in the storage unit 170 via the input unit 140. The threshold value 173 may be, for example, "0", but may also be another value.

The control unit 180 includes an input control unit 181, a center of gravity candidate region extraction unit 182, and a cutout control unit 184. The control unit 180 may further include a moving image advertising region extraction unit 183 or an output control unit 185. The control unit 180 will be described in detail later.

Figure 5:
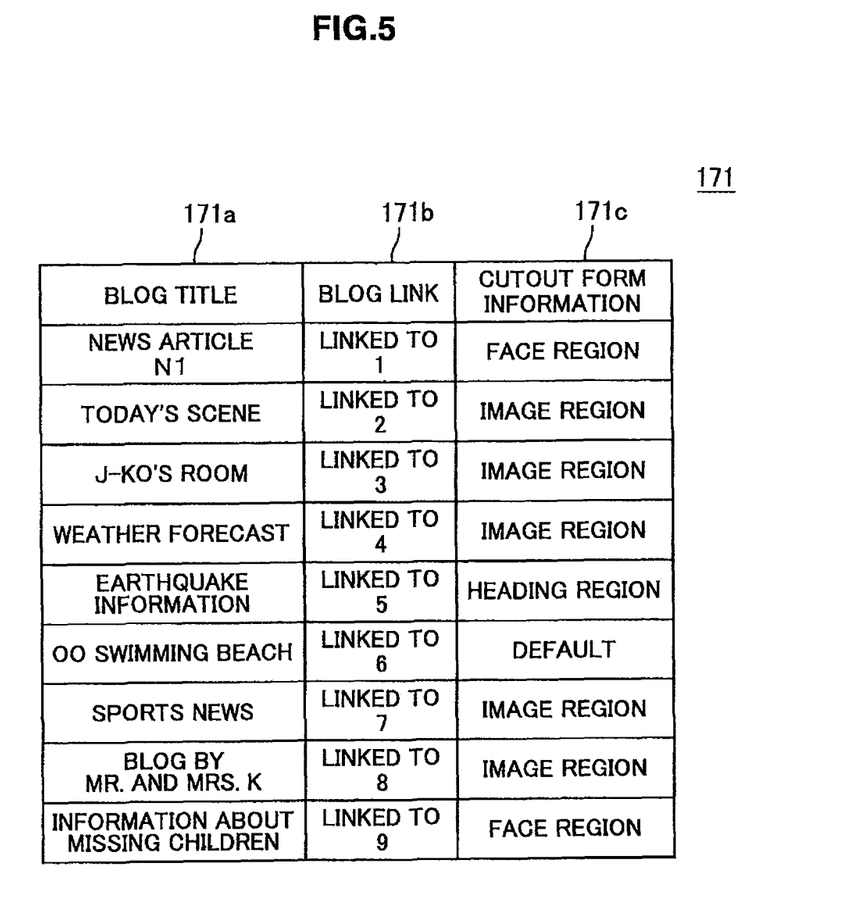
FIG. 5 is a diagram showing a data structure example of bookmark information according to an embodiment of the present invention.

FIG. 5 is a diagram showing a data structure example of bookmark information according to an embodiment of the present invention. The data structure example of bookmark information according to an embodiment of the present invention will be described below using FIG. 5 (FIGS. 1 to 4 are referred when appropriate).

The bookmark information 171 includes a blog title 171*a*, a blog link 171*b*, and cutout form information 171*c*.

The blog title 171*a* shows the title of a blog. The user acquires and views content of a blog by using, for example, the information processing apparatus 100 and if it is highly probable that the user will view the blog again, the user acquires the title thereof by using the information processing apparatus 100 and sets the title to the blog title 171*a*. Here, the blog title 171*a* is assumed to be the title of a blog, but is not limited to the title of a blog and may be the title of a WEB page.

The blog link 171*b* shows the address of a blog. The user acquires and views content of a blog by using, for example, the information processing apparatus 100 and if it is highly probable that the user will view the blog again, the user acquires the address thereof by using the information processing apparatus 100 and sets the address to the blog link 171*b*. Here, the blog link 171*b* is assumed to be the address of a blog, but is not limited to the address of a blog and may be the address of a WEB page.

The cutout form information 171*c* shows the cutout form of a thumbnail image from a blog page. The user sets the cutout form information 171*c* by associating with the blog title 171*a* and the blog link 171*b* by using, for example, the information processing apparatus 100. The type of value set as the cutout form information 171*c* will be described in detail later.

Figure 6:
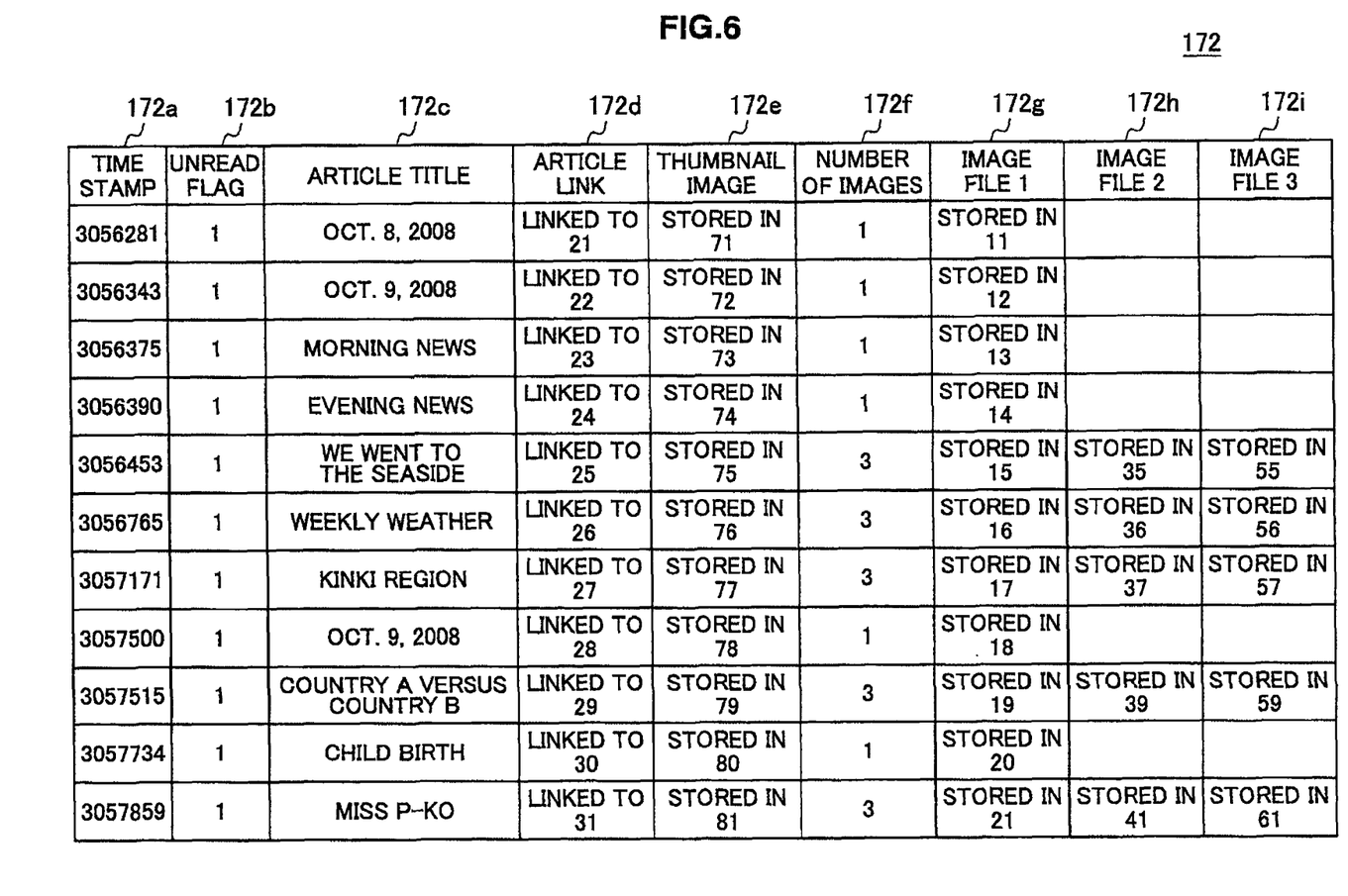
FIG. 6 is a diagram showing a data structure example of feed information according to an embodiment of the present invention.

FIG. 6 is a diagram showing a data structure example of feed information according to an embodiment of the present invention. The data structure example of feed information according to an embodiment of the present invention will be described below using FIG. 6 (FIGS. 1 to 4 are referred when appropriate).

The feed information 172 includes a time stamp 172*a*, an unread flag 172*b*, an article title 172*c*, an article link 172*d*, a thumbnail image 172*e*, a number of images 172*f*, an image file 1 (172*g*), an image file 2 (172*h*), and an image file 3 (172*i*). The feed information 172 is transmitted from the content delivery apparatus 200 in accordance with a request from, for example, the information processing apparatus 100 and contains information about updated blogs among blogs set in the bookmark information 171. A page of a blog will be called an article below. Therefore, a new article is generated each time a blog is updated.

The time stamp 172*a* is attached to each article. Here, it is assumed that the time stamp 172*a* is attached by the information processing apparatus 100 by being incremented by 1 each time a blog is updated and as consecutive numbers to all blogs set in the feed information 172.

The unread flag 172*b* shows whether or not an article is read. It is assumed that when the user acquires an article using the information processing apparatus 100, the value of the unread flag 172*b* changes from "1: unread" to "0: read".

The article title 172*c* shows the title of an article. The title of an article may be embedded in the article or attached to the article. The article link 172*d* shows the address of an article. The thumbnail image 172*e* shows the storage destination of a thumbnail image cut out from an article. The number of images 172*f* shows the number of images contained in an article.

The image file 1 (172*g*), the image file 2 (172*h*), and the image file 3 (172*i*) show storage destinations of images contained in an article and as many storage destinations as the number of images 172*f* are set. Here, in FIG. 6, the maximum number of the number of images 172*f* is "3" and three storage destinations of images are set, but the number of storage destinations is not limited to 3 and can be changed as appropriate in accordance with the maximum number of the number of images 172*f*.

Figure 7:
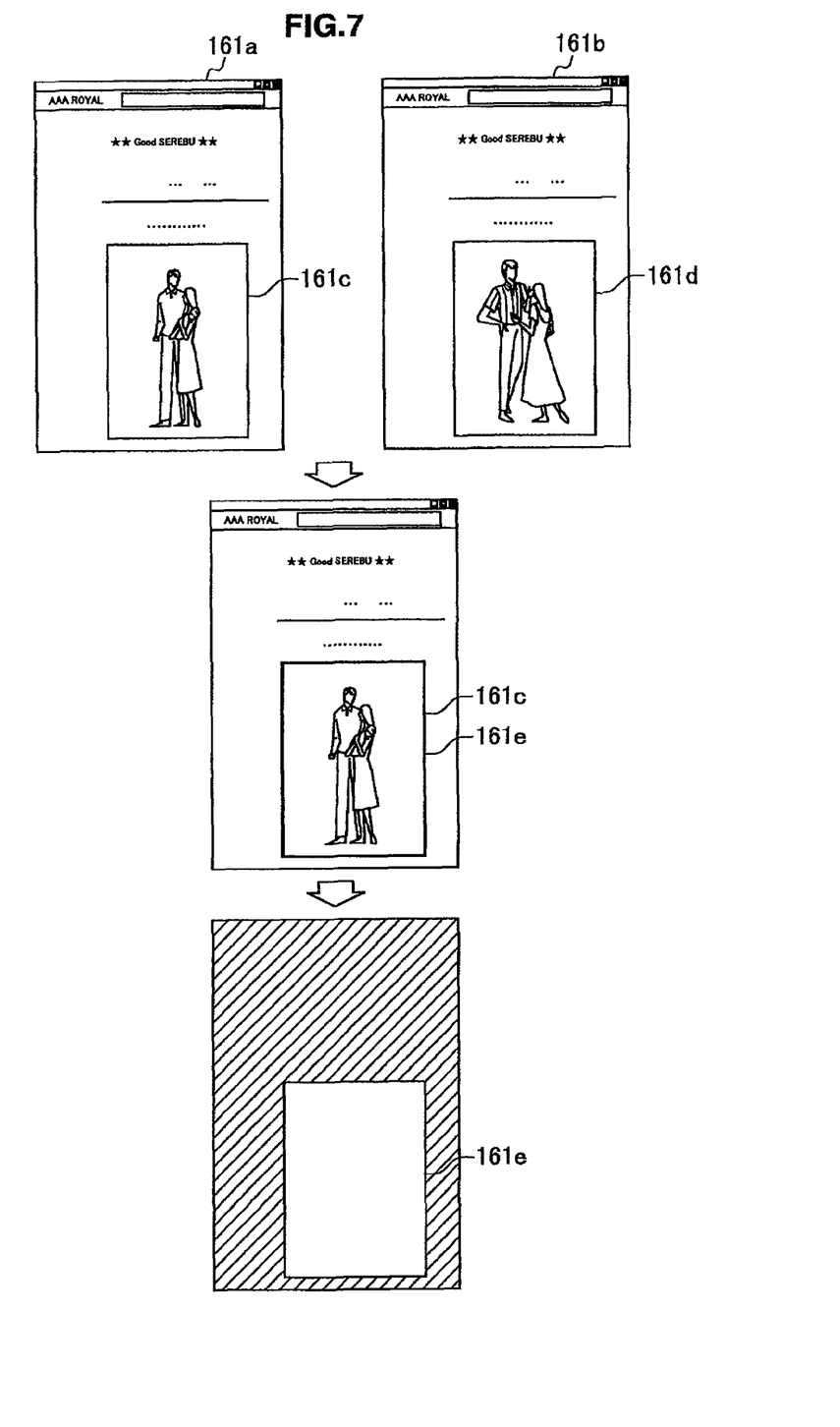
FIG. 7 is an explanatory view (part 1) illustrating a function held by a control unit according to an embodiment of the present invention.

FIG. 7 is an explanatory view (part 1) illustrating a function held by the control unit according to an embodiment of the present invention. The function held by the control unit according to an embodiment of the present invention will be described below using FIG. 7 (FIGS. 1 to 4 are referred when appropriate).

The input control unit 181 receives first content data (data to be the source of a WEB page 161*b*) from the content delivery apparatus 200 via the communication unit 150 and converts the first content data into first image data before causing the storage unit 170 to store the first image data. The input control unit 181 also receives second content data (data to be the source of a WEB page 161*a*) generated by a portion or the whole of the first content data being updated from the content delivery apparatus 200 via the communication unit 150 and converts the second content data into second image data before causing the storage unit 170 to store the second image data.

The center of gravity candidate region extraction unit 182 calculates difference values of color information between corresponding pixels of the first image data (image data converted from the WEB page 161*b*) and the second image data (image data converted from the WEB page 161*a*) stored in the storage unit 170. The center of gravity candidate region extraction unit 182 extracts a center of gravity candidate region constituted by pixels whose calculated difference value exceeds the threshold value 173 stored in the storage unit 170. FIG. 7 shows an example in which the center of gravity candidate region extraction unit 182 determines that difference values of color information between corresponding pixels of an image 161*d* pasted to the WEB page 161*b* and an image 161*c* pasted to the WEB page 161*a* exceed the threshold value 173. In this case, the center of gravity candidate region extraction unit 182 extracts a region in which the image 161*c* is present as a center of gravity candidate region.

The cutout control unit 184 cuts out thumbnail image data corresponding to a cutout region, which is a region containing a portion or the whole of the center of gravity candidate region cut out by the center of gravity candidate region extraction unit 182 from the second image data. FIG. 7 shows an example in which the cutout control unit 184 cuts out thumbnail image data corresponding to the whole of the center of gravity candidate region (the region where the image 161*c* is present) extracted by the center of gravity candidate region extraction unit 182 as a cutout region 161*e* from the second image data.

According to the configuration described above, small-area thumbnail image data containing an important region of the WEB page 161*a* can be cut out.

Figure 8:
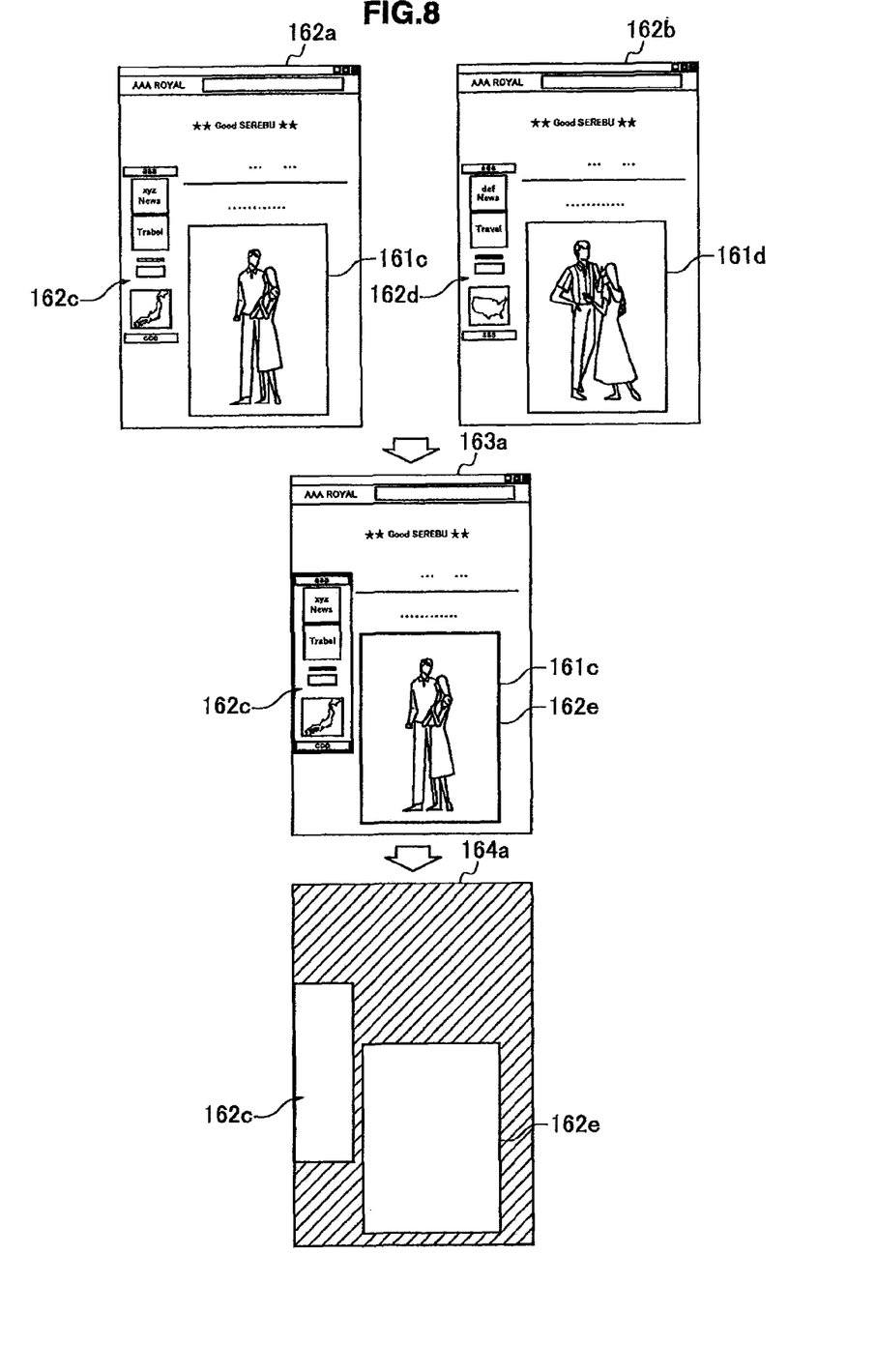
FIG. 8 is an explanatory view (part 2) illustrating a function held by a control unit according to an embodiment of the present invention.

FIG. 8 is an explanatory view (part 2) illustrating a function held by the control unit according to an embodiment of the present invention. The function held by the control unit according to an embodiment of the present invention will be described below using FIG. 8 (FIGS. 1 to 4 are referred when appropriate).

As shown in FIG. 8, a WEB page 162*a* may contain a moving image advertising region 162*c*. In such a case, it is assumed that the center of gravity candidate region extraction unit 182 may also extract the moving image advertising region 162*c* as a center of gravity candidate region. However, it is difficult to assume that the moving image advertising region 162*c* is an important region of the WEB page 162*a*. Thus, it is necessary to exclude the moving image advertising region 162*c* from the center of gravity candidate region.

Figure 9:
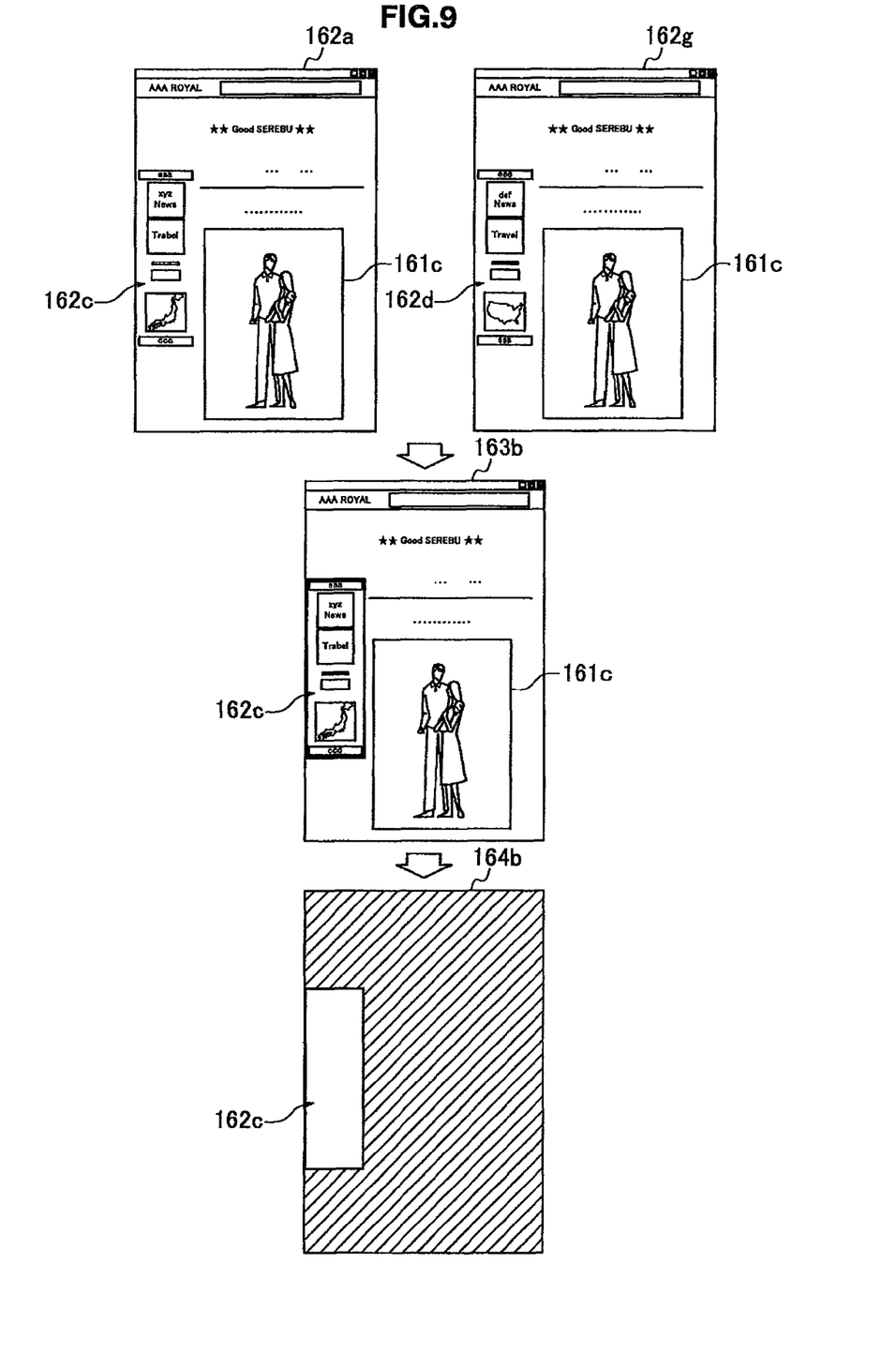
FIG. 9 is an explanatory view (part 3) illustrating a function held by a control unit according to an embodiment of the present invention.

FIG. 9 is an explanatory view (part 3) illustrating a function held by the control unit according to an embodiment of the present invention. The function held by the control unit according to an embodiment of the present invention will be described below using FIG. 9 (FIGS. 1 to 4 are referred when appropriate).

To exclude the moving image advertising region 162*c* from the center of gravity candidate region, the control unit 180 may be further provided with the moving image advertising region extraction unit 183. In such a case, the input control unit 181 performs processing to receive second content data from the content delivery apparatus 200 via the communication unit 150 and processing to convert the received second content data into second image data before causing the storage unit 170 to store the second image data more than once. FIG. 9 shows an example in which second content data (data to be the source of the WEB page 162*a*) is first received to perform processing and then, second content data (data to be the source of the WEB page 162*a*) is received to perform processing. The second processing is performed when a predetermined time (for example, 100 ms) passes after the first processing is performed.

The moving image advertising region extraction unit 183 calculates difference values of color information between corresponding pixels of pieces of second content data caused to be stored in the storage unit 170 by the input control unit 181. The moving image advertising region extraction unit 183 extracts the moving image advertising region 162*c*, which is a region constituted by pixels whose calculated difference value exceeds the threshold value 173 stored in the storage unit 170.

Figure 10:
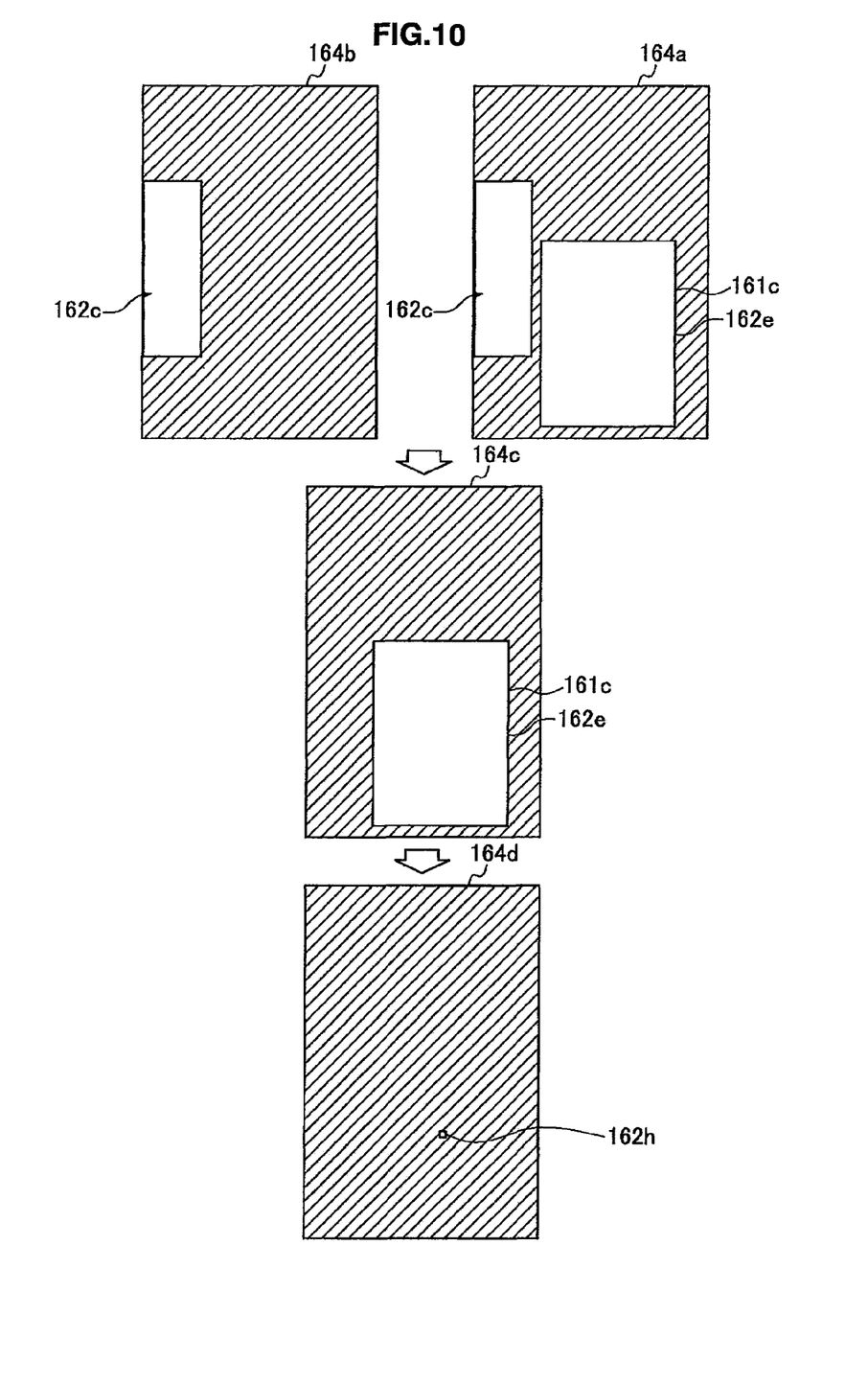
FIG. 10 is an explanatory view (part 4) illustrating a function held by a control unit according to an embodiment of the present invention.

FIG. 10 is an explanatory view (part 4) illustrating a function held by the control unit according to an embodiment of the present invention. The function held by the control unit according to an embodiment of the present invention will be described below using FIG. 10 (FIGS. 1 to 4 are referred when appropriate).

The moving image advertising region extraction unit 183 extracts a center of gravity region (the region where the image 161*c* is present) by excluding the extracted moving image advertising region 162*c* from the center of gravity candidate region (the region where the image 161*c* is present and the moving image advertising region 162*c*).

The cutout control unit 184 sets a region containing a portion or the whole of the center of gravity region (the region where the image 161*c* is present) cut out by the moving image advertising region extraction unit 183 as a cutout region 162*e*. FIG. 10 shows an example in which the cutout control unit 184 cuts out thumbnail image data corresponding to the whole center of gravity region (the region where the image 161c is present) extracted by the moving image advertising region extraction unit 183 as the cutout region 162e from second image data.

According to the configuration described above, even if the moving image advertising region 162c is contained in the WEB page 162a, small-area thumbnail image data containing an important region of the WEB page 162a can be cut out.

The cutout control unit 184 may calculate the average values of coordinates of pixels constituting a center of gravity region extracted by the center of gravity candidate region extraction unit 182 as center of gravity coordinates 162h to set as a cutout region a predetermined rectangular region specified by using the calculated center of gravity coordinates 162h as a reference. The predetermined rectangular region specified by using the calculated center of gravity coordinates 162h as a reference is, for example, a rectangular region in which the center of gravity coordinates 162h become a point of intersection of diagonal lines.

The center of gravity region extracted by the moving image advertising region extraction unit 183 is not necessarily a rectangular region. If the center of gravity region is not a rectangular region, the cutout control unit 184 may set a rectangular region contained in the center of gravity region extracted by the moving image advertising region extraction unit 183 as a cutout region.

The center of gravity region extracted by the moving image advertising region extraction unit 183 is not necessarily constituted by image regions only and may contain characters or the like. If the center of gravity region contains characters or the like, characters present in a heading region of the center of gravity region frequently show the title or a summary of the WEB page 162a. Also, the heading region of the center of gravity region is frequently an important region of the WEB page 162a. Therefore, the cutout control unit 184 may set a heading region of the center of gravity region extracted by the moving image advertising region extraction unit 183 as a cutout region.

The center of gravity region extracted by the moving image advertising region extraction unit 183 may contain a face region. If the center of gravity region contains a face region, the face region is frequently an important region of the WEB page 162a. Therefore, the cutout control unit 184 may set a face region of the center of gravity region extracted by the moving image advertising region extraction unit 183 as a cutout region.

The form of cutting out thumbnail image data by the cutout control unit 184 from the center of gravity region may be set by the user. In such a case, when the output control unit 185 accepts input of the cutout form information 171c showing the cutout form from the user via the input unit 140, the output control unit 185 causes the storage unit 170 to store the cutout form information 171c whose input is accepted. The cutout control unit 184 sets a region specified by the cutout form indicated by the cutout form information 171c stored in the storage unit 170 as a cutout region.

Default cutout form information may be stored in the storage unit 170. In such a case, if no cutout form information 171c is input by the user, the cutout control unit 184 may set the region specified by the cutout form indicated by the default cutout form information as a cutout region.

Thumbnail image data cut out by the cutout control unit 184 from second image data (image data converted from the WEB page 161a) may be output by the output control unit 185. For example, the output control unit 185 displays thumbnail image data cut out by the cutout control unit 184 from second image data via the display unit 160. If thumbnail image data is displayed via the display unit 160, for example, a screen as shown in the thumbnail image display screen 120 is displayed.

For example, the output control unit 185 may transmit thumbnail image data cut out by the cutout control unit 184 from second image data to another apparatus via the communication unit 150. In such a case, thumbnail image data cut out by the cutout control unit 184 from second image data is displayed in the display unit of the other apparatus.

In the foregoing, the function configuration of the information processing apparatus according to an embodiment of the present invention has been described. Next, an operation of the information processing apparatus according to an embodiment of the present invention will be described.

6. Operation of the Information Processing Apparatus

Figure 11:
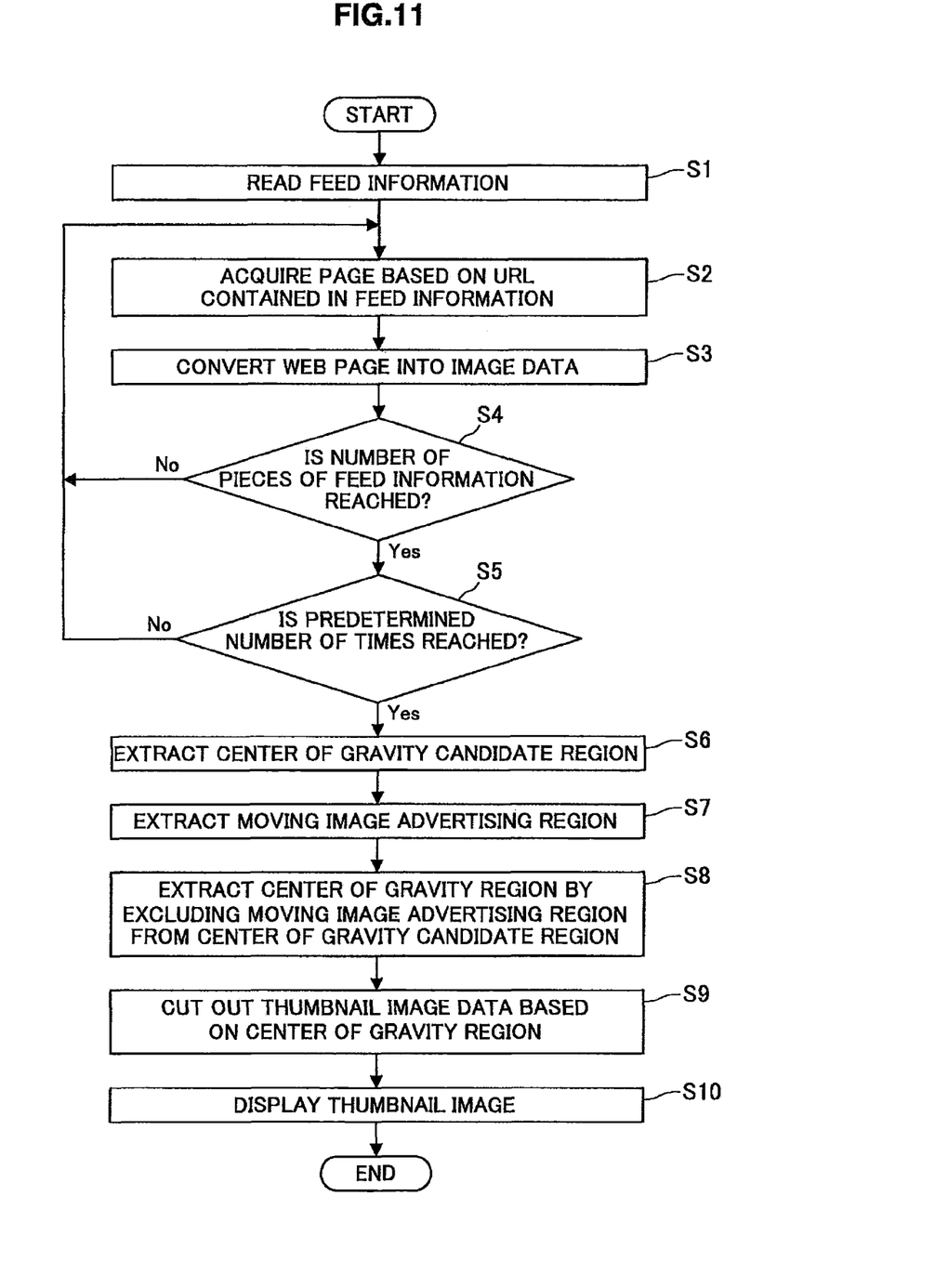
FIG. 11 is a flow chart showing an operation of the information processing apparatus according to an embodiment of the present invention.

FIG. 11 is a flow chart showing an operation of the information processing apparatus according to an embodiment of the present invention. The operation of the information processing apparatus according to an embodiment of the present invention will be described below using FIG. 11 (FIGS. 1 to 10 are referred when appropriate). Processing to acquire a WEB page of blog will be described below, but data to be acquired is not limited to WEB pages of blog and may be general WEB pages, content data to be the source of content to be displayed in a display apparatus and the like. An entry below is an article of blog and is newly generated each time a WEB page of blog is updated.

First, when the user starts an application via the input unit 140, the input control unit 181 reads feed information from the content delivery apparatus 200 via the communication unit 150 (step S1). Feed information is described in a markup language such as XML and a URL list (the article link 172d) of each entry (generally, 10 latest entries are used) of all blogs registered by parsing the feed information is acquired. The input control unit 181 acquires feed information based on, for example, information registered in the bookmark information 171.

Next, the input control unit 181 acquires a WEB page (content data) from the content delivery apparatus 200 via the network 300 (the Internet) based on the URL list contained in the acquired feed information (step S2). The input control unit 181 causes the storage unit 170 to store the acquired WEB page (content data) as image data (step S3). The input control unit 181 converts the WEB page into image data by using various techniques such as capturing a browser screen, using APIs of a browser engine, and using WEBAPI for capture. The image data is stored, for example, in the image file 1 (172g).

The input control unit 181 determines whether steps S2 and S3 are performed as many times as the number of entries of blog contained in feed information (step S4). If all WEB pages are acquired each time an application started, the information processing apparatus 100 will be overloaded. Thus, control may be exercised, for example, to omit acquisition of WEB pages of the same URLs as those of WEB pages acquired when the application was started last time.

If the input control unit 181 has not performed steps S2 and S3 as many times as the number of entries of blog contained in feed information ("No" at step S4), the input control unit 181 returns to step S2. If the input control unit 181 has performed steps S2 and S3 as many times as the number of entries of blog contained in feed information ("Yes" at step S4), the input control unit 181 determines whether the number of times of acquiring each WEB page has reached the predetermined number of times (step S5). Here, the predetermined number of times is, for example, two times, three times and the like and is not specifically limited if at least two times. If the input control unit 181 determines that the number of times of acquiring each WEB page has not reached the predetermined number of times ("No" at step S5), the input control unit 181 returns to step S2 and, after a predetermined time such as 100 ms passes, acquires the same WEB page again. If the input control unit 181 determines that the number of times of acquiring each WEB page has reached the predetermined number of times ("Yes" at step S5), the center of gravity candidate region extraction unit 182 calculates difference values of image data from other entries of the same blog to extract a center of gravity candidate region based on the calculated difference values (step S6).

Processing of center of gravity candidate region extraction will be described. The center of gravity candidate region extraction unit 182 compares color information of corresponding pixels of image data acquired by converting an entry (the WEB page 162a) to be displayed and that acquired by converting the previous entry (the WEB page 162b). The center of gravity candidate region extraction unit 182 can acquire the image 161c and a moving image advertisement (moving images present in the moving image advertising region 162c) by subtracting color information of corresponding coordinates of image data acquired by converting the previous entry (the WEB page 162b) from that of pixels of image data acquired by converting an entry (the WEB page 162a) to be displayed (see image 163a). In a WEB page of blog, each entry generally uses a background image, the title, static advertising content and the like that are common to all entries. Thus, only updated information (the image 161c and moving image advertisements (moving images present in the moving image advertising region 162c)) is acquired. An image acquired by binarizing the image is set as an image 164a. However, dynamic advertising content implemented by Flash or the like is contained in the image 164a so that it is difficult to consider the image as complete differential information.

Thus, the moving image advertising region extraction unit 183 next calculates a difference of color information of corresponding pixels of the same entries acquired at different times to extract a moving image advertising region (step S6). The moving image advertising region extraction unit 183 compares color information of corresponding pixel of image data acquired by converting an entry (the WEB page 162a) to be displayed and that acquired by converting the same entry (the WEB page 162a) as that to be displayed acquired at a different time. The center of gravity candidate region extraction unit 182 can acquire a moving image advertisement (moving images present in the moving image advertising region 162c) by subtracting color information of corresponding coordinates of image data obtained by converting the same entry (the WEB page 162b) from that of pixels of image data acquired by converting an entry (the WEB page 162a) to be displayed (see image 163b). If dynamic content is imaged as a still image at a different time in a WEB page of blog, a difference in color information arises and therefore, only moving image advertisements (moving images present in the moving image advertising region 162c) are acquired. An image obtained by binarizing the image is set as an image 164b.

The moving image advertising region extraction unit 183 eliminates the moving image advertising region 162c by subtracting values of the image 164b from those of the image 164a regarding corresponding pixels to extract a center of gravity region (the region where the image 161c is present) (step S8).

The cutout control unit 184 cuts out thumbnail image data based on the center of gravity region (step S9). The output control unit 185 displays thumbnail images in the display unit 160 based on the thumbnail image data cut out by the cutout control unit 184 (step S10). The cutout control unit 184 may calculate the average values of coordinates of each pixel constituting the center of gravity region (the region where the image 161c is present) as the center of gravity coordinates 162h. The cutout control unit 184 can efficiently extract a differential region of a WEB page of blog by extracting any region specified by the center of gravity coordinates 162h.

7. Effects According to the Present Embodiment

According to the present embodiment, after an important region in syndication type WEB content like a blog is extracted, the extracted important region can be displayed in a small-area display apparatus. Accordingly, an effect of being able to realize a thumbnail image layout that has high visibility and eliminates advertisement information is achieved.

Moreover, in the present embodiment, high-precision information region extraction can be achieved by using information delivered by the RSS field even if it is difficult to acquire adequate information by the RSS field due to ISP (Internet Services Provider) side limitations.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-276884 filed in the Japan Patent Office on Oct. 28, 2008, the entire content of which is hereby incorporated by reference.

What is claimed is:
1. An information processing apparatus, comprising:
one or more processors operable to:
    store a threshold value in a storage unit;
    perform communication with a content delivery apparatus;
    receive first content data from the content delivery apparatus, convert the first content data into first image data before causing the storage unit to store the first image data, receive second content data generated by a portion or all of the first content data being updated from the content delivery apparatus, and convert the second content data into second image data before causing the storage unit to store the second image data;
    calculate first difference values of color information between corresponding pixels of the first image data and the second image data stored in the storage unit;
    extract a first region for generating a thumbnail image data from the second image data, wherein the first region is constituted by pixels with the first difference values which exceed the threshold value stored in the storage unit; and
    cut out the thumbnail image data corresponding to a first cutout region, wherein the first cutout region comprises a portion or the whole of the first region extracted from the second image data.

2. The information processing apparatus according to claim 1, wherein the one or more processors are operable to calculate, as first coordinates, average values of coordinates of pixels constituting the first region to set, as the first cutout region, a predetermined rectangular region specified based on the first coordinates.

3. The information processing apparatus according to claim
wherein the one or more processors are operable to:
perform processing to receive the second content data from the content delivery apparatus and processing to convert the second content data into the second image data before causing the storage unit to store the second image data more than once;
calculate second difference values of color information between corresponding pixels of pieces of the second content data stored in the storage unit to extract a moving image advertising region, wherein the moving image advertising region is constituted by pixels with the second difference values which exceed the threshold value stored in the storage unit, and extract a second region by excluding the moving image advertising region from the first region, and
set a region containing a portion or the whole of the second region as a second cutout region.

4. The information processing apparatus according to claim 3, wherein the one or more processors are operable to:
calculate, as second coordinates, average values of coordinates of pixels constituting the second region to set, as the second cutout region, a predetermined rectangular region based on the second coordinates.

5. The information processing apparatus according to claim 3, wherein the one or more processors are operable to:
set a rectangular region contained in the second region as the second cutout region.

6. The information processing apparatus according to claim 3, wherein the one or more processors are operable to:
set a heading region of the second region as the second cutout region.

7. The information processing apparatus according to claim 3, wherein the one or more processors are operable to:
set a face region contained in the second region as the second cutout region.

8. The information processing apparatus according to claim 3, wherein the one or more processors are operable to:
accept input of cutout form information indicating a cutout form from a user, to cause the storage unit to store the cutout form information and set a region specified by the cutout form indicated by the cutout form information stored in the storage unit as the second cutout region.

9. The information processing apparatus according to claim 1, wherein the one or more processors are operable to:
display the thumbnail image data cut out from the second image data.

10. The information processing apparatus according to claim 1, wherein the one or more processors are operable to:
transmit the thumbnail image data cut out from the second image data.

11. An information processing method of an information processing apparatus, comprising:
receiving first content data from a content delivery apparatus via a communication unit, converting the first content data into first image data before causing a storage unit to store the first image data, receiving second content data generated by a portion or all of the first content data being updated from the content delivery apparatus via the communication unit, and converting the second content data into second image data before causing the storage unit to store the second image data;
calculating first difference values of color information between corresponding pixels of the first image data and the second image data stored in the storage unit and extracting a first region for generating a thumbnail image data from the second image data, wherein the first region is constituted by pixels with the first difference values which exceed a threshold value stored in the storage unit; and
cutting out the thumbnail image data corresponding to a first cutout region, wherein the first cutout region comprises a portion or whole of the first region extracted from the second image data.

12. A non-transitory computer-readable storage medium having stored thereon, a computer program having at least one code section for information processing, the at least one code section being executable by a computer for causing the computer to perform steps comprising:
receiving first content data from a content delivery apparatus via a communication unit, converting the first content data into first image data before causing a storage unit to store the first image data;
receiving second content data generated by a portion or all of the first content data being updated from the content delivery apparatus via the communication unit;
converting the second content data into second image data before causing the storage unit to store the second image data;
calculating first difference values of color information between corresponding pixels of the first image data and the second image data stored in the storage unit and extracting a first region for generating a thumbnail image data from the second image data, wherein the first region is constituted by pixels with the first difference values which exceed a threshold value stored in the storage unit; and
cutting out the thumbnail image data corresponding to a first cutout region, wherein the first cutout region comprises a portion or whole of the first region extracted from the second image data.

13. The non-transitory computer-readable storage medium according to claim 12, further comprising:
calculating, as first coordinates, average values of coordinates of pixels constituting the first region for setting, as the first cutout region, a predetermined rectangular region specified based on the first coordinates.

14. The non-transitory computer-readable storage medium according to claim 12, further comprising:
receiving the second content data by the input control unit from the content delivery apparatus and processing to convert the second content data into the second image data before causing the storage unit to store the second image data more than once;
calculating and storing second difference values of color information between corresponding pixels of pieces of the second content data stored in the storage unit to extract a moving image advertising region, wherein the moving image advertising region is constituted by pixels with the second difference values exceeding the threshold value stored in the storage unit;
extracting a second region by excluding the moving image advertising region from the first region; and
setting a region containing a portion or the whole of the second region as a second cutout region.

15. The non-transitory computer-readable storage medium according to claim 14, further comprising:

calculating, as second coordinates, average values of coordinates of pixels constituting the second region by the cutout control unit for setting, as the second cutout region, a predetermined rectangular region based on the second coordinates.

16. The information processing method according to claim 11, further comprising:
calculating, as first coordinates, average values of coordinates of pixels constituting the first region for setting, as the first cutout region, a predetermined rectangular region specified based on the first coordinates.

17. The information processing method according to claim 11, further comprising:
receiving the second content data by the input control unit from the content delivery apparatus and processing to convert the second content data into the second image data before causing the storage unit to store the second image data more than once;

calculating second difference values of color information between corresponding pixels of pieces of the second content data stored in the storage unit to extract a moving image advertising region, wherein the moving image advertising region is constituted by pixels with the second difference values exceeding the threshold value stored in the storage unit;

extracting a second region by excluding the moving image advertising region from the first region; and setting a region containing a portion or the whole of the second region as a second cutout region.

18. The information processing method according to claim 17, further comprising:
calculating, as second coordinates, average values of coordinates of pixels constituting the second region for setting, as the second cutout region, a predetermined rectangular region by using the second coordinates.

* * * * *